Figure 1:
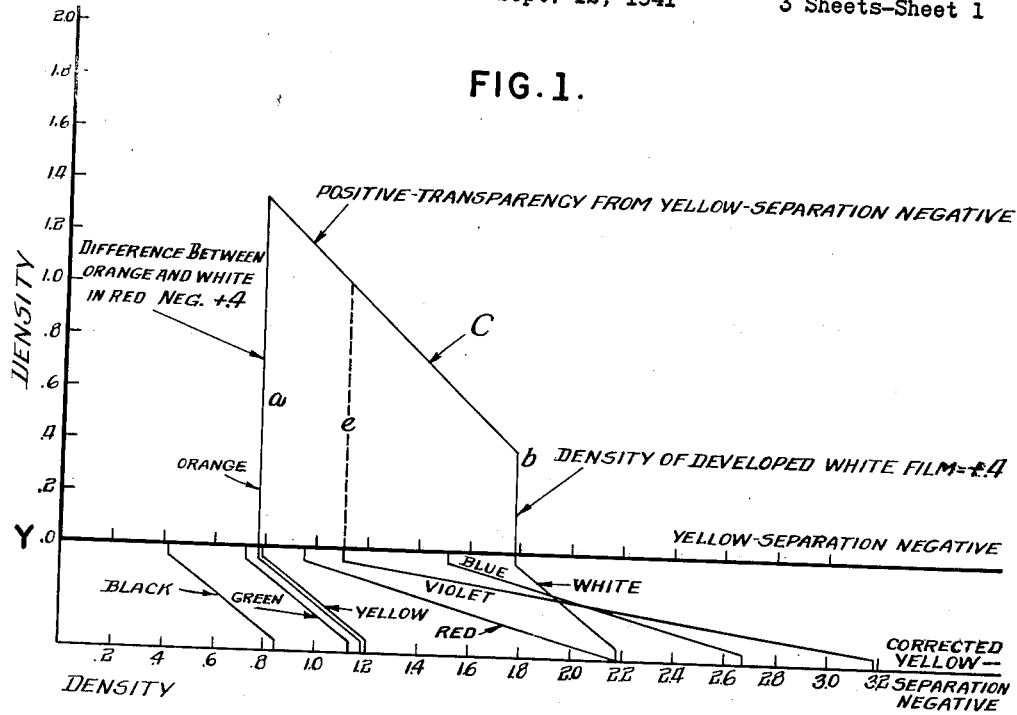

July 18, 1944.    B. L. SITES    2,354,149
CORRECTION OF COLOR-SEPARATION NEGATIVES
Filed Sept. 12, 1941    3 Sheets-Sheet 1

INVENTOR.
Benjamin L. Sites
BY Walter M. Fuller atty.

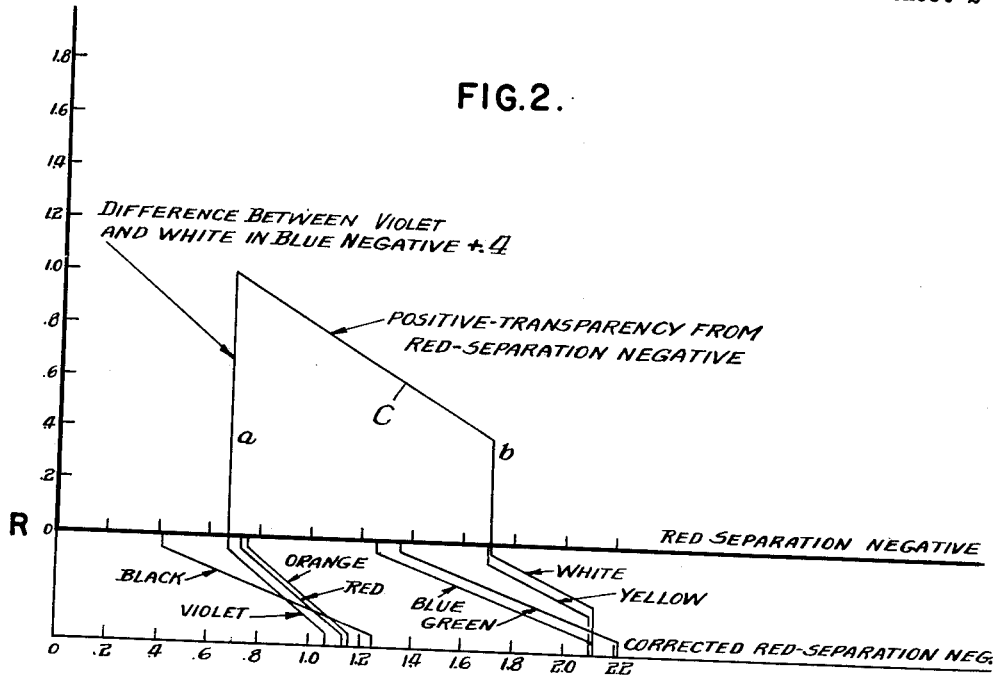
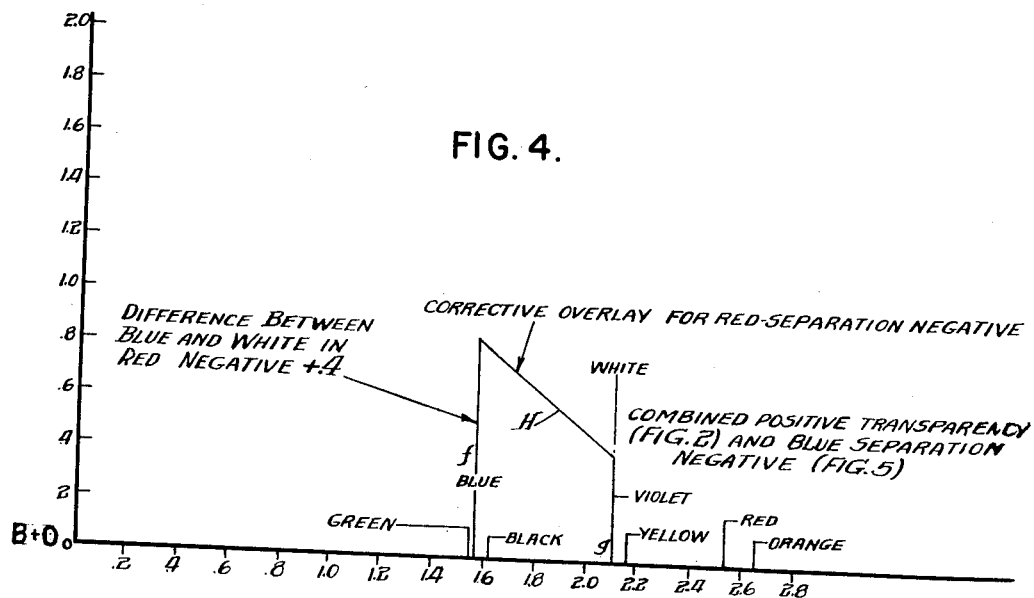

July 18, 1944.   B. L. SITES   2,354,149
CORRECTION OF COLOR-SEPARATION NEGATIVES
Filed Sept. 12, 1941   3 Sheets-Sheet 3
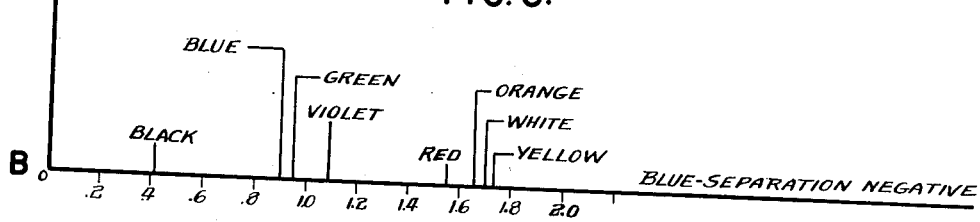
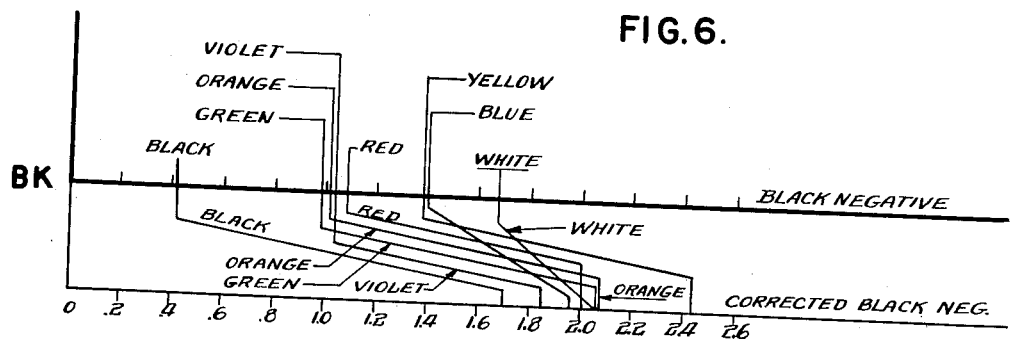
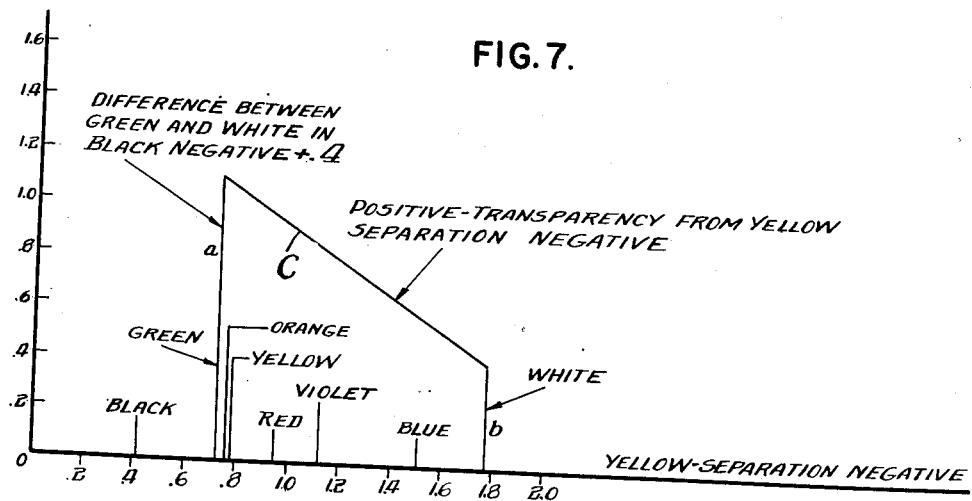
INVENTOR.
Benjamin L. Sites
BY Walter M. Fuller
atty.

Patented July 18, 1944

2,354,149

UNITED STATES PATENT OFFICE 2,354,149

CORRECTION OF COLOR-SEPARATION NEGATIVES

Benjamin L. Sites, Chicago, Ill., assignor to Miehle Printing Press and Manufacturing Company, Chicago, Ill., a corporation of Illinois Application September 12, 1941, Serial No. 410,520

3 Claims. (Cl. 95—5.1)

The current invention concerns certain procedural advantages and resulting functional benefits accruing from improvements and betterments in the printing arts in the production of suitable protective and corrective photographic-transparency overlays for the color-separation negatives used in making the corresponding printing-plates.

One outstanding and leading object of this invention is to simplify the practice whereby to avoid the necessity of the exercise of personal skill and judgment in order to obtain results of a high degree of order and excellence, or, stated somewhat otherwise, a paramount purpose of the invention is to place the necessary operations on a more or less systematic basis, rather than depending upon the aptitude and personal discretion of the operator.

It was, therefore, one purpose of extended preliminary laboratory work in practising the color-separation method to standardize the procedures for producing the overlays of the correct values to be associated with the respective color-separation negatives.

This made it imperative to determine how to interpret the individual separation-negatives in order to allow precalculation of the proper values of the overlays for suitable safeguarding and correction of the negatives with which they were to be employed.

To cope with this requirement, a graphical-method was invented for representing the separation-negatives and their areas denoting various colors, and a graphical construction for depicting the overlays, and, by the use of these graphical means of analysis, it was discovered that the step of combining the protective positive-transparency from the Yellow-separation negative with the Blue-separation negative was inferior to that of combining such positive-transparency from the Yellow-separation negative with the Red-separation negative.

It was found also that the Blue-separation negative could be used, in most cases, in an uncorrected state, whereas the Black-negative offered some difficulty, one way of making such printing-plate having been developed by myself using the graph-system and involving the employment of a positive-transparency from the Yellow-separation negative to correct it.

The hemi-tone positive-transparency used in the making of the Black hemi-tone printing-plate is produced in such a manner that the solid Blacks will be represented therein by dots approximately one-half the tone-value of a checkerboard-design, the reason for this being that Blacks will probably be properly rendered by the other three colors and the Blacks in the Black printing-plate need only be reinforced in slight degree.

In the preparation of the copy for making the color-separation negatives, it will be understood that along with the copy there will preferably, but not indispensably, be placed an associated Gray-scale or Black-to-White wedge, and a companion or supplemental color-chart, the latter consisting of areas of six colors: Yellow, Red, Blue, Green, Orange and Violet, these colors being desirably, but not necessarily, all of approximately the same weight and selected to represent the solid weight of the color, and, preferably, the Green, Orange and Violet are each composed of equal weights of the two primary colors used to make them, that is to say, equal intensities of Yellow and Blue for the Green, like intensities of Yellow and Red for the Orange, and equal intensities of the Red and Blue for the Violet.

Whereas Red and Blue areas have been referred to above, in actual practice, the reddish color Magenta may be employed in place of the Red and a blue color known in the trade as "Cyan" may be used as a substitute for the well-known Blue. In any case, such areas will be referred to herein as Red and Blue.

In some cases, the Gray-scale or Black-to-White wedge and the color-chart need not be used with the copy, the needed color-areas being adequately present in the copy itself.

The color-separation negatives having been made of the subject, that is of the copy with or without the associated Gray-scale or Black-to-White wedge and the color-chart, the first requirement in the making of the protective and corrective overlays for such negatives is to know exactly what is wanted, and the second, of course, is the making of the predetermined overlays.

Figure 3:
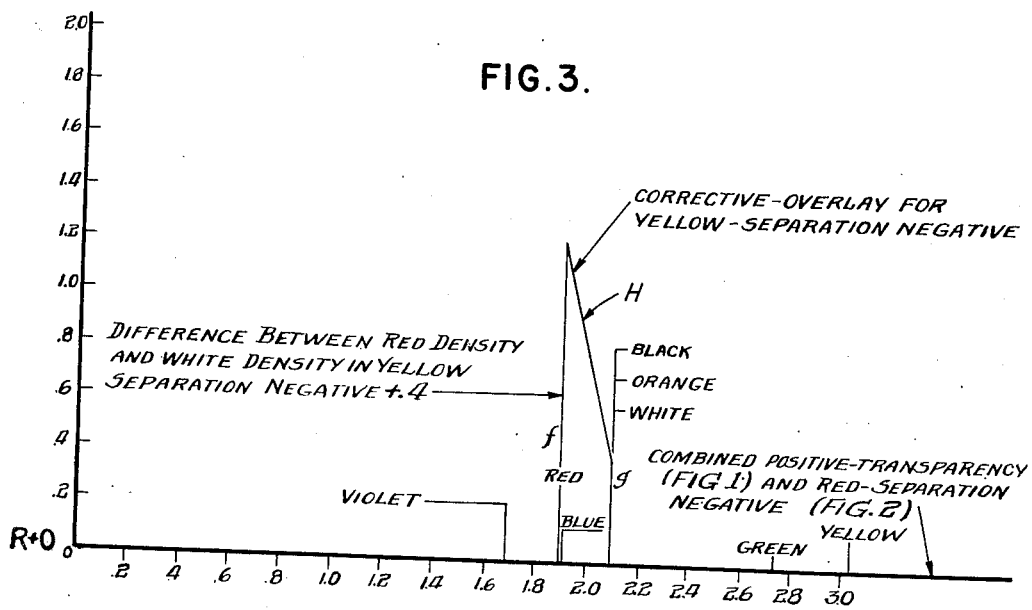

In the accompanying drawings, forming a part of this specification, and to which reference should be had in connection with the ensuing description, graphic representations have been presented thus:

Figure 1 shows the Yellow-separation negative, on the base-line Y, the first or initial protective-overlay to be used with the Red-separation negative, and the final corrected Yellow-separation negative;

Figure 2 discloses on its base-line designated R the original Red-separation negative and on its lower horizontal line the corrected Red-separation negative, the inclined line depicting the initial protective-overlay to be used with the Blue-separation negative;

Figure 3 presents on its base-line designated R+O the combination of the Red-separation negative and such first or initial protective overlay (Fig. 1) and it also depicts, as the inclined line, the final overlay to be used with the Yellow-separation negative for the correction of the latter;

Figure 4 reveals on its base-line B+O the combination of such a first protective-overlay (Fig. 2) and the Blue-separation negative, and its sloping line also shows the final corrective-overlay for use with the Red-separation negative.

Figure 5 on its base-line B represents the Blue-separation negative;

Figure 6 on its base-line BK portrays the original, and on its supplemental horizontal line the corrected, Black-separation negative; and Figure 7 defines the Yellow-separation negative and the overlay for the Black-separation negative.

It will be understood by those acquainted with this art that, whereas reference is herein made to colors in the separation-negatives, overlays, and in the graphs relating thereto, the actual colors do not appear therein but rather representations corresponding to such colors, the negatives and overlays being merely monotone photographic-transparencies; and it should be borne in mind that Black is not considered as a color.

The novel graphical method of analyzing and of computing the characteristics of the color-separation negatives and their overlays may be best explained by reference to these accompanying graphs Yellow (Figure 1), Red (Figure 2), Blue (Figure 5), and Black (Figure 6), respectively.

The densities of the areas in each color-separation negative representing the different colors of the color-chart, or their equivalents in the copy, as the case may be, including the Black and White of the Gray-scale, or wedge, are the only features considered in computing the overlays, these densities being read or determined by means of a known densitometer obtainable on the market.

A typical case of densities, for illustration, is presented below and used in the discussion of the graphs of the several figures of the drawings.

Considering the Yellow, Red and Blue separation-negative graphs only, omitting the Black, an examination of their horizontal base-lines or axes indicates that, in each case, there is a group of three colors bunched or grouped well together on the low density portion of the scale and all including the designated separated-color of that particular color-separation negative; thus Green, Orange and Yellow are the low density ones on the Yellow-separation negative (Figure 1); Violet, Red and Orange on the Red-separation negative (Figure 2); and Blue, Green and Violet on the Blue-separation negative (Figure 5).

Green, Orange, and Yellow (Figure 1) all incorporate Yellow and can be designated as the "Yellow" colors. In the same way, Violet, Red and Orange are the "Red" colors because each embraces Red; and Blue, Green and Violet are the "Blue" colors for each includes Blue.

These groups might also be considered as the "desired" colors in respect to the individual separation-negative under consideration, so that all other colors outside of the "desired" group are the "undesired" colors and should be eliminated from the negative to produce a true color-separation.

If densities could be added to those portions of each of these negatives representing these undesired colors in sufficient amount to raise their values to equal or to exceed the density representing White therein, they would be eliminated, but, in accomplishing this, however, care must be taken not to modify the relative density-ranges of the desired colors any appreciable amounts, the purpose of the corrective-overlays being to add this extra density to the undesired colors while the relative density-ranges of the desired colors remain substantially unchanged; the term density-range being used herein to mean the difference between the density of the color under consideration and the density of White.

The graph illustrated in Figure 1 shows that the Red, Violet and Blue should be eradicated from the Yellow-separation negative in order to effect its correction, and the logical negative to use to accomplish this result would be the Red-separation one, since in such negative (Figure 2) the Red is of relatively low density affording the easiest means for adding the required amount by means of a positive-overlay made through the red-separation negative, but, if this Red-separa-

|  | Black | White | Yellow | Red | Blue | Orange | Green | Violet |
|---|---|---|---|---|---|---|---|---|
| Yellow-negative | .42 | 1.78 | .78 | .96 | 1.51 | .77 | .73 | 1.12 |
| Red-negative | .41 | 1.71 | 1.70 | .72 | 1.26 | .75 | 1.35 | .67 |
| Blue-negative | .42 | 1.70 | 1.73 | 1.54 | .90 | 1.66 | .95 | 1.09 |
| Black-negative | .42 | 1.67 | 1.39 | 1.08 | 1.40 | 1.02 | .99 | 1.04 |

This table gives the density-readings for all areas on each negative for the sake of completeness, but, it will be understood later on, however, that it is not necessary to record all areas, only a few being necessary.

In the systems of rectilinear-coordinates in the accompanying graphs, the densities of the auxiliary colored-areas of the color-chart, or of the corresponding colored-areas of the copy itself if it has the proper colors, and Black and White are plotted as abscissae on base-line Y, R, B, and Bk (Figures 1, 2, 5 and 6) which are graphical representations of the Yellow, Red, Blue and Black negatives, respectively, the scale of plotting, namely .2, in this instance, for each graduation holding true for both the horizontal and vertical axes for all negatives.

tion negative were used for that purpose, the Orange in the Yellow-separation negative would suffer since the Orange density does not vary greatly from that of the Red density in the Red-separation negative, and approximately the same amount of density would be added to the Orange in the Yellow-separation negative thereby undesirably eliminating Orange to approximately the same extent as the Red.

The needed result is accomplished, by the present invention, by making a positive-transparency protective-overlay through the Yellow-separation negative in such a manner that the Orange area in such overlay will have sufficient density whereby, when it is added to that of the Orange area of the Red-separation negative, the modified density of such Orange area in the Red-separation negative will be raised to the combined density of White in such negative and the developed White-density of the overlay.

The reason for the presence of a certain amount of developed White-density in the overlay is that it is necessary, for the successful carrying-out of this invention, to have all transparencies, negatives and positives, developed so as to fall on the straight-line portion of the emulsion H—D curve. The presence of the developed White-density in the overlay insures this. Experimentation has indicated that a present practical value for this density is .4, but this value may change with the various types of emulsions used, however .4 has been found to be a practical value and will be used in this illustration.

The difference in density between orange and white on the Red-separation negative (Figure 2) is 1.71—.75=.96, which, when .4 is added thereto makes 1.36 as the density needed in an overlay made through the Yellow-separation negative to properly protect the Orange when the overlay is superimposed on, and in register with, the Red-separation negative.

A vertical line $a$ 1.36 units long is erected at the position of Orange on the Yellow-separation negative base-line Y (Figure 1), the length of such vertical line then representing the density of the Orange in a positive-transparency protective-overlay to be made through the Yellow-separation negative, and, in the same manner, a line $b$ .4 unit long is erected at the White position on the same graph, indicating the developed White-density in such positive-transparency overlay.

By connecting the top extremities of these two lines $a$ and $b$ by a straight line C, it can, by observation, be seen that the densities in the positive-transparency for the other colors will be represented by the lengths of vertical lines erected through their positions on the Yellow base-line to the line C, and thus the density of Violet, for instance, would be given by the line $e$ as 1.03.

This density-gradient line C can be considered as a graphical representation of the protective positive-transparency to be made through the Yellow-separation negative, or, in other words, the overlay to be used with the Red-separation negative, and the procedure for making this initial overlay will be considered hereinafter, it being borne in mind that such overlay is to be made as indicated on the straight-line portion of the light-sensitive medium employed.

Base-line R+O (Figure 3) represents the densities of the combination of the positive-transparency overlay C and the Red-separation negative R (Figure 2), the data for which is secured by adding the density values of the Red-separation negative to those of the positive-transparency overlay C, the various densities of the latter being obtained in the manner illustrated by the line $e$ for Violet, but, in practice, it is more correct to read the actual densities on the densitometer of the superimposed transparency and negative. Through this combination a second photographic transparency-overlay is made to finally correct the Yellow-separation negative.

Observation indicates that, in this case, the Red density in the Yellow-separation negative (Figure 1) should be raised to the White density thereof plus the developed White density of the final corrective overlay to be used therewith, if the Red is to be excluded, this value being 1.78—.96=.82, which, with the addition of .4 for the developed White density in the overlay becomes 1.22.

As before, a line equal in length to 1.22 density is erected on the R+O base-line at the Red position as line $f$ (Figure 3).

Erecting line $g$ at the White position .4 unit long and completing the construction of the density-gradient line H by connecting the tops of the two lines $f$ and $g$, gives the latter as the geometrical representation of the final corrective-overlay for the Yellow-separation negative.

If overlay H be laid in contact and in register with the Yellow-separation negative, it will be perceived that the density-ranges of the colors Orange, Green and Yellow are practically undisturbed, because the overlay adds only the developed White-density to such colors and to White, and the relative density-ranges of these colors is not altered, but that the colors Violet, Red and Blue are eliminated, due to the fact that they have substantial densities in the overlay, thus effecting a correction in this negative by preservation of the desired colors, and, at the same time, removing the undesired colors.

While Red has been considered in the above example as the most objectionable color to be eliminated from the Yellow-separation negative, it should be understood that this procedure is equally effective when any one of the group of the undesired colors, such as Violet or Blue, is of lowest density of such group in the Yellow-separation negative and this color is dealt with as Red has been dealt with above, the same reason as to the lowest density color applying to the treatment of the other separation-negatives in rendering their correction.

The correction or alteration of the Red-separation negative is effected basically on the principles described above at length, the Blue-separation negative being involved in such procedure. It is unnecessary to specify the details of the construction of the "Red" graph (Figures 2 and 4) as the values are clearly shown and the construction lines are assigned similar reference letters, it being sufficient to state that the important colors to be considered in this connection are the Violet, Blue and White of both negatives.

It has been found that, ordinarily, it is unnecessary to correct the Blue-separation negative, since the Red and Orange are not disturbing enough therein to warrant the extra work and expense of making the overlays, but such Blue-separation negative has been represented in Figure 5. Under certain conditions wherein the utmost in color correction or improvement is desired, it may be necessary to correct the Blue-separation negative. This would be done by the same principle as described above involving the Blue and Yellow negatives and the Green, Red and White colors.

The Black-separation negative is presented in Figure 6 and its corrective-overlay in Figure 7, and, since the Yellow-separation negative is employed in this correction, it is depicted on the Yellow base-line for convenience in Figure 7.

The color of least density in the Black-separation negative is Green, and, as this is consequently the most disturbing color, it can best be removed by an overlay made through the Yellow-separation negative having a density $a$ of 1.08, which is the density of White (1.67) in the Black-separation negative minus the density of Green (.99) in the Black-separation negative, plus the density of the developed White (.4) as shown in the graph of Figure 7. When this overlay is applied on, and in register with, the Black-separation negative, it will be seen that all colors with the exception of Violet are eliminated and Black is raised so that its density-range is reduced. This is not objectionable since the Violet density is very nearly equal to the White density and the reduced Gray-scale is acceptable because it is deemed unnecessary to carry full strength in the Black printing-plate.

In following out the above procedures it has been found in practice that when the Blue-separation negative is used uncorrected, together with the other corrected negatives, the Browns of the copy are quite faithfully reproduced.

Summarizing the foregoing, the general rule for the correction of the Yellow, Red and Blue negatives is:

1. In the negative to be corrected, select that desired color which is common to both negatives under consideration (Orange in the case of the Yellow and Red separation-negatives, Violet in the case of the Red and Blue separation-negatives, and Green in the case of the Blue and Yellow separation-negatives) and protect it by means of a positive-overlay made through the negative to be corrected.

2. Combine such first positive-transparency protective-overlay with the appropriate assisting separation-negative, and make a final corrective-overlay through the combination, which second or last overlay, when superimposed on, and in register with, the negative to be corrected, will eliminate from such negative that color of the undesired group having the lowest density therein.

3. For the Black separation-negative, it is necessary only to make a positive overlay-transparency through the proper separation negative which would eliminate that color in the Black-separation negative having the lowest density therein.

The foregoing disclosure permits the predetermination of the densities and density-gradients of the various overlays used. Thus in each initial protective-overlay the densities of the protected blended-color which would be produced by a combination of the colors of the two negatives under consideration and the density of White have been preliminarily ascertained. In similar manner, in each final corrective-overlay the densities of the most objectionable color to be eliminated and of White have also been preliminarily determined. Overlays having these predetermined density characteristics may be produced by appropriate exposures and developments of their light-sensitive emulsions with the exposures through the appropriate negative or negative-overlay combination, as will be readily understood and practiced by one skilled in the art and when aided by densitometer measurements of the color-chart and Black-to-White wedge, or their equivalents, as reproduced in the overlay to insure that these predetermined density values are present in the overlays.

Whereas, the graphs of the drawings are of interest as illustrative of the underlying principles upon which the present invention is based, it is not necessary to employ such graphical procedures to determine the unknown factors necessary to the production of the required overlay-transparencies.

For example, the slope or gradient of the overlay line C of Figure 1 can be expressed as the ratio of the difference in densities between Orange and White in the Red-separation negative to the difference in densities between Orange and White in the Yellow-separation negative; that is to say, the ratio of the density represented by line $a$ minus .4 to the density represented by that portion of the base-line Y between line $a$ (Orange) and $b$ (White).

Such gradient or inclination of line C may also be specified as the ratio of the density-range of Orange in the Red-separation negative to the density-range of Orange in the Yellow-separation negative.

Knowing this inclination of line C, its exact position can be designated by definitely locating one point therein, as for instance, the density of Orange.

Being acquainted with the various values presented in Figure 1 and the principles involved, actually there is no need of drawing the graph, as it can be comparatively easily figured mathematically in one's head or on paper.

The corrective overlay H (Figure 3) can be similarly stated in terms of ratio and one definite point in the line.

Inasmuch as the foregoing invention has been set forth in detail, it is to be remembered that it is not necessarily limited and restricted to the precise and exact details outlined and that various modifications and departures may be resorted to without deviation from the invention as defined by the appended claims and without the loss or sacrifice of any of its material benefits and advantages.

I claim:

1. In the process of making a photographic-transparency protective-overlay through a first designated-color separation-negative of a multicolor subject for use with a second different designated-color separation-negative of the same subject, said first separation-negative including a group of separated-colors each incorporating said first separation-negative designated-color, said second separation-negative including a group of separated-colors each incorporating said second separation-negative designated-color, said subject having areas of different colors including (1) White and (2) the blended-color which would be produced by a combination of the designated colors of said two separation-negatives, the novel combination of steps, in any operative order, of: (a) determining in said first separation-negative said White-area density, (b) determining in said first separation-negative said blended-color area density, (c) determining in said second separation-negative said White-area density, (d) determining in said second separation-negative said blended-color area density, (e) preliminarily determining the density-gradient of the photographic-overlay to be produced through said first separation-negative for use with said second separation-negative, said density-gradient being the ratio of the density-range of said blended-color in said second separation-negative to the density-range of said blended-color in said first separation-negative, said gradient including as the density of said blended-color area the sum of the density-range of said blended-color in said second separation-negative and the developed White-area density, if any, in the overlay to be produced, (f) exposing a light-sensitive photographic-medium of known properties through said first separation-negative and developing and fixing said exposed medium to produce a photographic-overlay having said preliminarily-determined density-gradient and having its said blended-color area density such that when combined with said blended-color area density of said second separation-negative their combined blended-color area densities will at least equal the combined White-area densities in said second separation-negative and overlay.

2. In the process of making a final photographic-transparency corrective-overlay for a first designated-color separation-negative of a multi-color subject, an initial photographic-transparency protective-overlay being used in so doing in connection with a second different designated-color separation-negative of the same subject, said first separation-negative including its group of separated-colors each incorporating said first separation-negative designated-color, said second separation-negative including its group of separated-colors each incorporating said second separation-negative designated-color, said subject having areas of different colors including (1) White, (2) the blended-color which would be produced by a combination of the designated colors of said two separation-negatives, and (3) that one of the group of said separated-colors of said second separation-negative having the lowest density in said first separation-negative, the novel combination of steps, in any operative order, of: (a) determining the White-area density in said first separation-negative, (b) determining said blended-color area density in said first separation-negative, (c) determining the White-area density in said second separation-negative, (d) determining said blended-color area density in said second separation-negative, (e) preliminarily determining the density-gradient of said initial protective photographic- overlay to be produced, said density-gradient being the ratio of the density-range of said blended-color in said second separation-negative to the density-range of said blended-color in said first separation-negative, said gradient including as the density of said blended-color area the sum of the density-range of said blended-color in said second separation-negative and the developed White-area density, if any, in the protective overlay to be produced, (f) exposing a light-sensitive photographic-medium of known properties through said first separation-negative and developing and fixing said exposed medium to produce a photographic protective-overlay having said preliminarily-determined density-gradient and having its said blended-color are a density such that when combined with said blended-color area density of said second separation-negative, their combined blended-color area densities will at least equal the combined White-area densities of said second separation-negative and protective-overlay, (g) determining the combined-densities of said White-area in said initial-overlay and in said second separation-negative, (h) determining the combined-densities of said one-color area in said initial-overlay and in said second separation-negative, (i) determining said one color-area density in said first separation-negative, (j) preliminarily determining the density-gradient of the final corrective photographic-overlay for use with said first separation-negative, said density-gradient being the ratio of the density-range of said one-color in said first separation-negative to the density-range of said one-color in the combined second separation-negative and said initial protective-overlay, said gradient including as the density of said one-color the sum of the density-range of said one-color in said first separation-negative and the density, if any, of the developed White-area of the final corrective-overlay to be produced, (k) and exposing a light-sensitive photographic-medium of known properties through the combined initial-overlay and second separation-negative and developing and fixing said exposed-medium to produce said final photographic corrective-overlay having said preliminarily-determined final density-gradient and having its said one-color area density such that, when combined with said one-color area density in said first separation-negative, the combined-densities thereof will at least equal the combined White-area densities of said first separation-negative and said final corrective-overlay.

3. In the process of correcting a first designated-color separation-negative of a multi-color subject having areas of different colors including (1) White, (2) the blended-color which would be produced by a combination of the separated designated-color of said first separation-negative and the separated designated-color of a second different-color separation-negative of the same subject, each of said two separation-negatives having its group of separated colors each incorporating the designated-color of such negative, and (3) that one of the group of said separated-colors of said second separation-negative having the lowest density in said first-negative, the novel combination of steps, in any operative order, of: (a) determining in said first separation-negative the White-area density, (b) determining in said first separation-negative said blended-color area density, (c) determining in said second separation-negative said White-area density, (d) determining in said second separation-negative said blended-color area density, (e) making an initial photographic positive-transparency protective-overlay through said first separation-negative and in which overlay the density of said blended-color area is such that, when combined with the density of said blended-color area in said second-negative, the density of the combination will at least equal the combined White-area densities in said combined second separation-negative and overlay, (f) superimposing said initial-overlay on and in register with said second separation-negative, (g) determining in said first separation-negative said one-color area density, (h) making a final photographic-transparency corrective-overlay through said combined second separation-negative and initial-overlay and in which said final-overlay said one-color area density combined with said first separation-negative one-color area density will at least equal the combined White-area densities in said first separation-negative and final-overlay combination, and (i) superimposing said final-overlay and said first separation-negative on and in register with one another.

BENJAMIN L. SITES.